(12) United States Patent
Corey et al.

(10) Patent No.: US 12,163,822 B2
(45) Date of Patent: *Dec. 10, 2024

(54) FLUID METER TESTING AND PROFILING SYSTEM

(71) Applicant: OW Investors, LLC, Ocala, FL (US)

(72) Inventors: David Bellamy Corey, Tampa, FL (US); Christopher Michael Mastic, Ocala, FL (US); Michael Louis Mastic, Tampa, FL (US); Jeffrey Brian Butt, Ocala, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/532,149

(22) Filed: Nov. 22, 2021

(65) Prior Publication Data

US 2022/0236098 A1 Jul. 28, 2022

Related U.S. Application Data

(62) Division of application No. 16/424,477, filed on May 28, 2019, now Pat. No. 11,181,415.

(51) Int. Cl.
*G01F 25/10* (2022.01)

(52) U.S. Cl.
CPC .................. *G01F 25/10* (2022.01)

(58) Field of Classification Search
CPC ...... G01F 25/0007; G01F 25/10; G01F 25/14; G01F 25/13; G16Y 10/35; G16Y 20/20; G16Y 40/20; G16Y 40/40; Y04S 20/30; G01D 2218/10
See application file for complete search history.

(56) References Cited

U.S. PATENT DOCUMENTS

2017/0160124 A1* 6/2017 Drachmann ............ G01F 25/10

* cited by examiner

*Primary Examiner* — Timothy P Graves
(74) *Attorney, Agent, or Firm* — William Simmons; Simmons Patents

(57) ABSTRACT

A platform configured for evaluating metering technologies and generating meter profiles using information derived from a plurality of meters retrieved from a plurality of environments. The platform may include a centralized data storage system in communication with a fluid meter test bench system. A computing device automatically controls fluid meter test bench system to measure the accuracy of fluid meters and transfers meter data to at least one of the centralized data storage system or a local data silo in communication with the centralized data storage system. Exemplary meter data includes meter type data, meter test data and meter environmental data. Meter environmental data may comprise meter install location and at least one of fluid quality data or fluid meter mounting position. The platform is configured to provide a meter profile for each meter tested based at least in part on the meter data and the test system data.

20 Claims, 6 Drawing Sheets

Typical MUT

FLUID METER TESTING AND PROFILING SYSTEM

CLAIM TO PRIORITY

This Application is a divisional of U.S. patent application Ser. No. 16/424,477, which claims priority to US provisional application filed on 27 May 2018 and is a continuation of pending U.S. non-provisional application Ser. No. 16/019,479 filed on 26 Jun. 2018 claiming priority to U.S. provisional application 62/677,077 filed on 27 May 2018 and which is a continuation of pending U.S. application Ser. No. 15/646,043, filed on 10 Jul. 2017 and claiming priority to US provisional application 62/525,104 filed on 26 Jun. 2017 which are incorporated by this reference for all that they disclose for all purposes.

TECHNICAL FIELD

The invention relates to developing a centralized data collection platform in communication with a plurality of test systems deployed in a plurality of locations for generating an A Posteriori Database (APD) used to generate performance predictions for metering technology.

BACKGROUND OF THE INVENTION

No fluid measuring device (such as a water meter and a water meter test system) is ideal for providing error-free measurements. There will always be metering errors. The best one can do is develop a measurement process that provides repeatable results and adjust such a process over time to make it as accurate as possible. With regard to water meters used to measure water flow, every water meter, no matter its type, has limited measuring ability. Consequently, either part of the water consumption will not be registered (resulting in undercharging—lost revenue), or there will be an over-registration of the water consumption (resulting in overcharges). In either case, particularly in the area of metering water consumption, it is important to quantify the magnitude of such errors and determine what causes them so that entities purchasing water meters can make informed decisions regarding the type of meter to purchase in a particular environment. Such requires data collected from various trusted sources deployed in a plurality of locations using known-good data collection processes.

There are at least two basic types of data that are useful when considering the best item to purchase: (1) "laboratory" data and (2) field data. Laboratory data is simply data collected under controlled conditions. Measuring horsepower is a good example. However, it should be appreciated that horsepower values will not tell one how fast a vehicle will be on a given track. For such information, one needs field data. Field data is data collected from an item under normal use or after normal use. Thus, laboratory data predicts how an item will work in the real world, while field data tells one how an item actually works in the real world.

Currently, there is a general lack of organized information regarding laboratory data and field data with regard to water meters that could be used to provide insight into the real effect of environmental parameters on the performance of water meters. Such information would allow water utility personnel responsible for selecting metering technology to evaluate or estimate water meter accuracy for a target environment. Further, what has been clearly indicated from experiments and real-life experience is that not every water meter has the same sensitivity to the environmental parameters that affect meter accuracy over time. Thus, selecting the most adequate metering technology type (based on laboratory data/manufacturer specifications) and the proper construction that best suits the target environment (i.e., the specific characteristics of the water supply system) is important.

What is needed is a data collection system comprising both field and laboratory data related to the factors that can affect water meter accuracy for both domestic and industrial meter types. One way to assemble such information is to create a centralized data storage system generated from a plurality of trusted sources using verified data collection processes and equipment in a plurality of environments.

The present invention teaches the establishment of an A Posteriori Database (APD) using "laboratory data" and "field data" derived from meter tests using a network of certified fluid meter test benches where the field data is based on evaluations of meters removed from a known metering environment.

SUMMARY OF THE INVENTION

Some of the objects and advantages of the invention will now be outlined in the following description, while other objects and advantages of the invention may be obvious from the description or may be learned through the practice of the invention.

Broadly speaking, a principal object of the present invention is to provide a centralized database comprising meter data collected using a plurality of certified test systems configured for verifying the accuracy of fluid meters.

Another object of the invention is to provide a network of certified fluid meter test systems associated with a global centralized data storage system.

Still, another object of the invention is to develop an A posteriori database comprising testing information for a plurality of meters deployed in a plurality of environments.

A still additional object of the invention is to generate meter profiles that include predictions for metering performance that are environment specific.

A further object of the invention is to track the individual components of metering systems and track performance and durability data for such individual components.

Additional objects and advantages of the present invention are set forth in the detailed description herein or will be apparent to those skilled in the art upon reviewing the detailed description. Also, it should be further appreciated that modifications and variations to the specifically illustrated, referenced, and discussed steps or features hereof may be practiced in various uses and embodiments of this invention without departing from the spirit and scope thereof by virtue of the present reference thereto. Such variations may include, but are not limited to, the substitution of equivalent steps referenced or discussed and the functional, operational, or positional reversal of various features, steps, parts, or the like. Still further, it is to be understood that different embodiments, as well as different presently preferred embodiments, of this invention may include various combinations or configurations of presently disclosed features or elements or their equivalents (including combinations of features or parts or configurations thereof not expressly shown in the FIGURES or stated in the detailed description).

Upon review of the remainder of the specification, those of ordinary skill in the art will better appreciate the features and aspects of such embodiments, and others.

BRIEF DESCRIPTION OF THE DRAWINGS

A full and enabling description of the present subject matter, including the best mode thereof, directed to one of ordinary skill in the art, is set forth in the specification, which refers to the appended FIGURES, in which.

Figure 1:
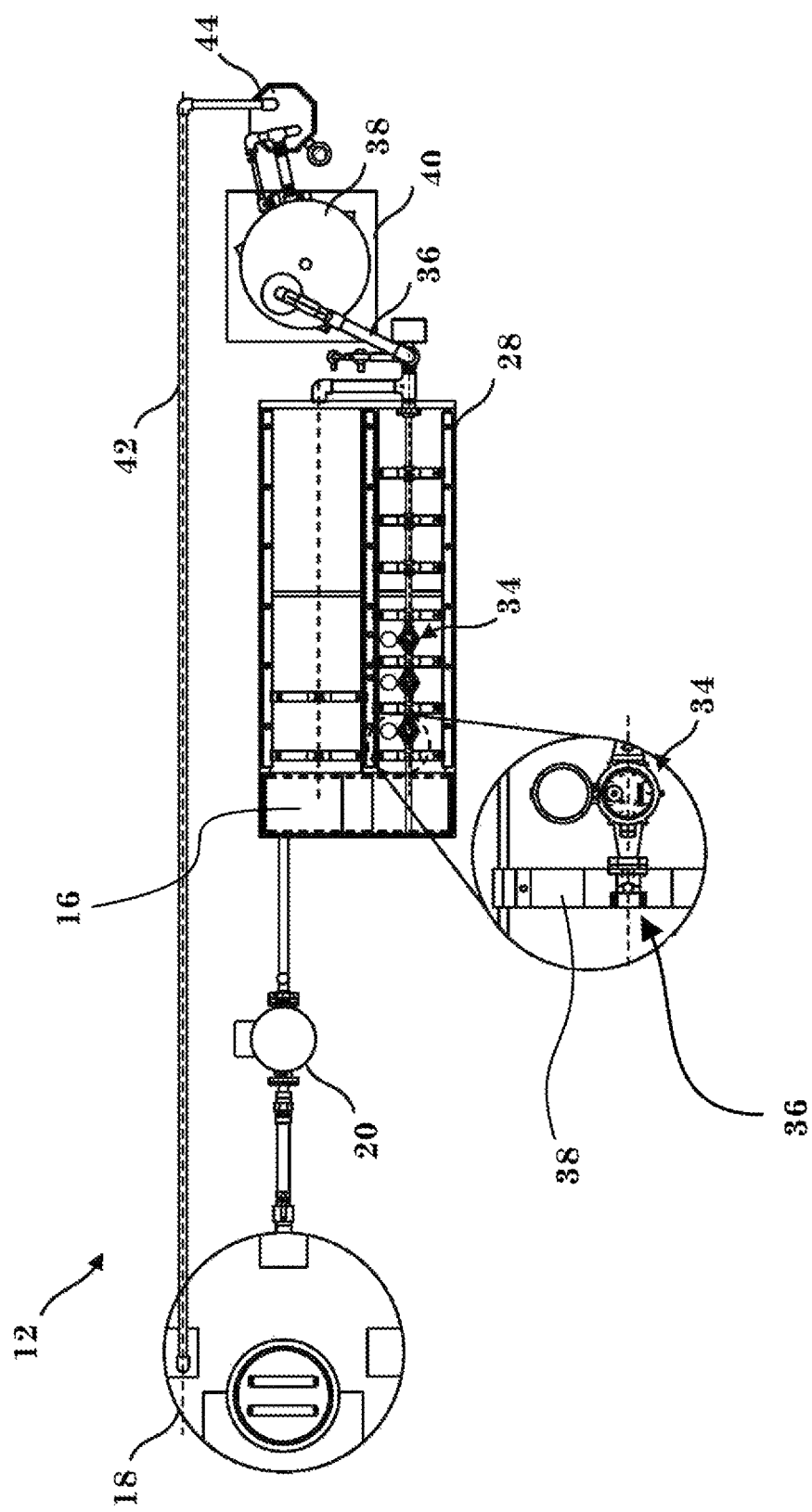
FIG. 1 is a top plan view of an exemplary fluid meter test bench.

Repeat use of reference characters throughout the present specification and appended drawings is intended to represent the same or analogous features or elements of the present technology.

DISCLOSURE OF THE INVENTION

Detailed Description

Reference now will be made in detail to the embodiments of the invention, one or more examples of which are set forth below. Each example is provided by way of an explanation of the invention, not a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeat use of reference characters is intended to represent the same or analogous features, elements, or steps. It is to be understood by one of ordinary skill in the art that the present discussion is a description of exemplary embodiments only and is not intended to limit the broader aspects of the present invention.

Construction Aids

For the purposes of this document, two or more items are "mechanically associated" by bringing them together or into a relationship with each other in any number of ways, including direct or indirect physical "releasable connections" (snaps, screws, Velcro®, bolts, etc.—generally connections designed to be easily and frequently released and reconnected), "hard-connections" (welds, gluing, rivets, macular bonds, generally connections that one does not anticipate disconnecting very often if at all and that is "broken" to separate), and/or "moveable connections" (rotating, pivoting, oscillating, etc.).

Similarly, two or more items are "electrically associated" by bringing them together or into a relationship with each other in any number of ways, including (a) a direct, indirect, or inductive communication connection and (b) a direct/indirect or inductive power connection. Additionally, while the drawings may illustrate various electronic components of a system connected by a single line, it will be appreciated that such lines may represent one or more signal paths, power connections, electrical connections and/or cables as required by the embodiment of interest.

For the purposes of this document, unless otherwise stated, the phrase "at least one of A, B, and C" means there is at least one of A, or at least one of B, or at least one of C or any combination thereof (not one of A, and one of B, and one of C).

As used herein, unless stated otherwise, the terms "first," "second," and "third" may be used interchangeably to distinguish one component from another and are not intended to signify the location or importance of the individual components.

As used herein, the terms "upstream" and "downstream" refer to the relative location of components in a fluid pathway. For example, component A is upstream of component B if fluid flows from component A to component B. Conversely, component A is downstream of component B if component A receives a fluid flow from component B.

An a posteriori database contains data based on experience or empirical evidence accumulated from testest systems. Notably, an a posteriori database may also include a priori knowledge and entries. As used in the claims, the definite article "said" identifies required elements that define the scope of embodiments of the claimed invention, whereas the definite article "the" merely identifies environmental elements that provide context for embodiments of the claimed invention that are not intended to be a limitation of any claim.

This document includes headers that are used for place markers only. Such headers are not meant to affect the construction of this document, do not in any way relate to the meaning of this document, nor should such headers be used for such purposes.

DESCRIPTION

While the particulars of the present invention and associated technology may be adapted for use with any system configured to measure a parameter, the examples discussed herein are primarily in the context of test benches configured to verify the accuracy of fluid meters such as water meters.

Embodiments of the present invention relate to a platform 10 configured for evaluating and profiling metering technologies from information derived from a plurality of fluid meter test systems 12 deployed in a plurality of environments and in communication with a centralized data storage system 14.

It seems useful to initially consider a fluid meter test system used to collect real-world meter data. It should be appreciated that much (but not all) of the fluid meter test bench system technology depicted in FIG. 1 and FIG. 2 has been developed over the past forty-plus years by the applicant, who started developing fluid meter test bench systems in the early 1980s. As is well known, fluid meters are configured to measure the volume of a fluid flowing through the meter. Utility companies use fluid meters to measure fluid consumption for billing purposes. Such fluid meters require testing to verify accuracy. A fluid meter test system pushes fluid through both a fluid Meter-Under-Test (MUT) and a very accurate "reference meter." Restated, all the fluid that flows during a test flows through both the MUT (meter under test) and a reference meter. The reference meter is configured to generate a very accurate reference-volume reading (which is considered to be the correct reading). The MUT measures the volume of fluid that flows through its measuring chamber and generates a MUT-volume reading. Ideally, the reference-volume reading is perfectly accurate. If a MUT is also perfectly accurate, the MUT volume reading will be identical to the reference volume reading. How much the MUT volume reading varies from the reference volume reading is considered the MUT metering error. Further, a fluid meter would ideally have the same meter error at all flow rates. However, in the real world, the meter error is different depending on the flow rate, and a fluid meter may measure a 2 gallons/minute flow rate more accurately than 5 gallons/minute flow rate (for example). Thus, meters are typically tested at a plurality of flow rates.

Arguably, the most accurate way to test water meters is with a gravimetric system. Thus, the "reference meter" described above is actually a gravimetric system that generates the previously described reference-volume reading. While called a gravimetric system, such a system may use both gravimetric and volumetric technologies.

Figure 2:
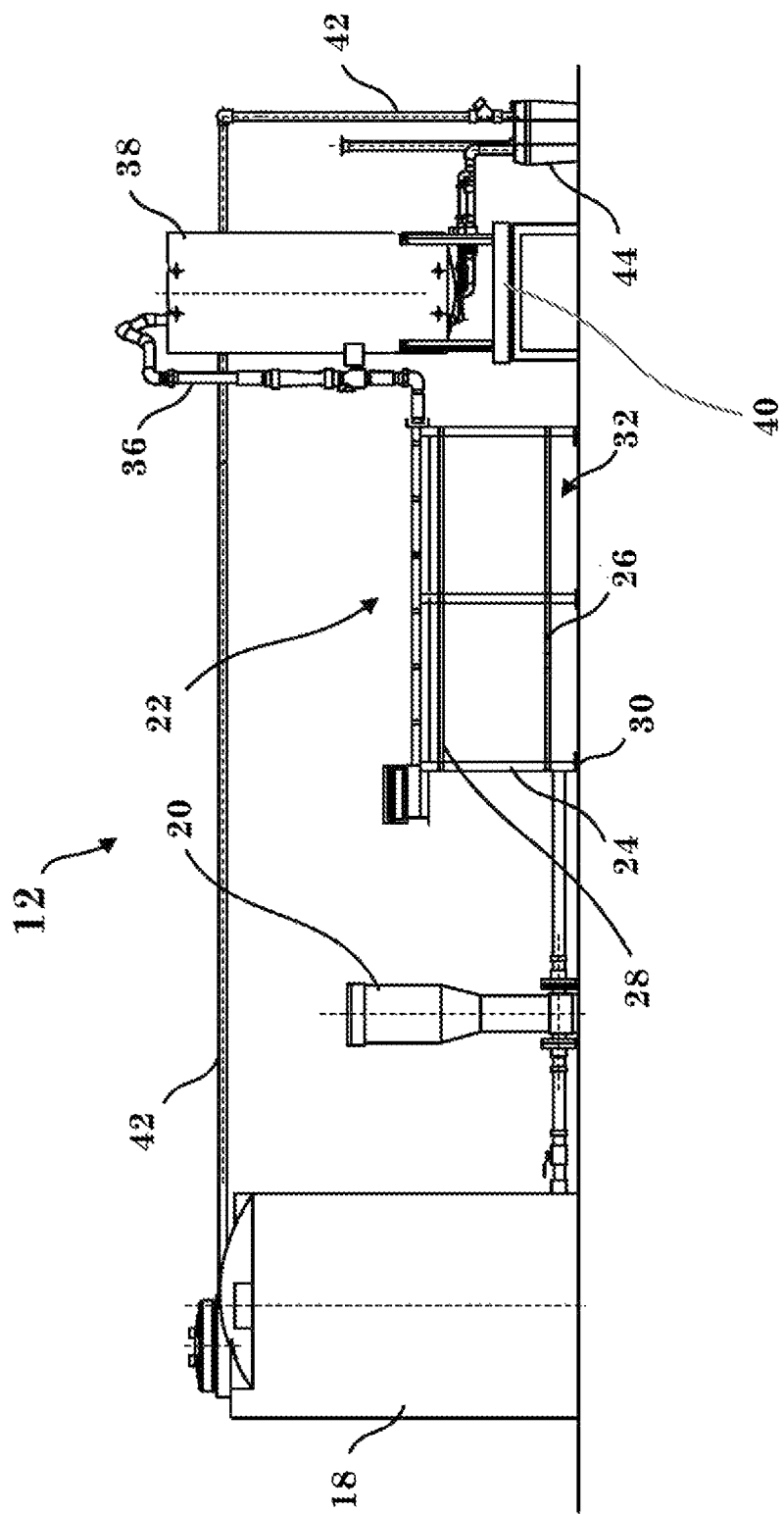
FIG. 2 is a side elevation view of an exemplary fluid meter test bench.

Referring now to FIG. 1 and FIG. 2, an electronically controlled Test Bench System 12 configured for testing the accuracy of fluid flow meters is presented. While the fluid could be any fluid, for the embodiments discussed herein, the fluid is water. The test bench system 12 is preferably electronically controlled and comprises a control console 16 that houses control wiring, a computer, and scale interface hardware (to communicate automatically with scales). Such components collectively define a controller 16 used to control the test bench system 12 to test fluid meters and serve as an operator interface for computerized and manually controlled tests. The test bench system 12 comprises a source tank 18 containing enough water to perform the desired test (e.g., 200 gallons). Source tank 18 is in fluid communication with a supply pump 20 in fluid communication with and supplies fluid to test bench 22.

As best seen in FIG. 2, test bench 22 comprises a plurality of vertical support rails 24 mechanically associated with lower support rails 26 and upper support rails 28. Preferably, lower support rails 26 are associated with the vertical support rails 24 a predefined distance from the vertical rail endpoints 30 to provide a toe space 32. Water from source tank 18 is pumped to and through the MUT 34 and output path 36 to a measurement tank 38, which rests on scales 40. The scales 40 are used to measure the weight of the water pumped through the MUTs 34 during the test and into the measurement tank 38, where such weight is used (at least in part) to determine a reference-volume value. Such reference-volume value is compared to that of the volumes registered on the various MUTs 34 to determine their respective accuracy.

After the reference-volume has been measured and the test is complete, the fluid in measurement tank 38 is drained via return lines 42 and returned to the source tank 18 using return pump 44, allowing the fluid to be reused in subsequent tests. One of ordinary skill in the art will appreciate, however, that the source tank 18 may be replaced with any suitable water source, and the test fluid may simply be drained from the measurement tank 38 and discarded, eliminating the need for return lines 42 and return pump 44.

As can be seen in FIG. 1, a plurality of MUTs 34 are connected in series, allowing the plurality of meters to be tested simultaneously. The input and output of each meter are associated with an adapter apparatus 36, which is further associated with a bench-to-apparatus interface 38 associated with a test bench flow path. Notably, the inputs and outputs of MUT 34 could be connected with a flow path defined by test bench 12 using typical prior art metering couplings; however, such requires much more work and time compared to using a specially made adapter apparatus for coupling a fluid meter to the fluid flow path of a test system.

Figure 3:
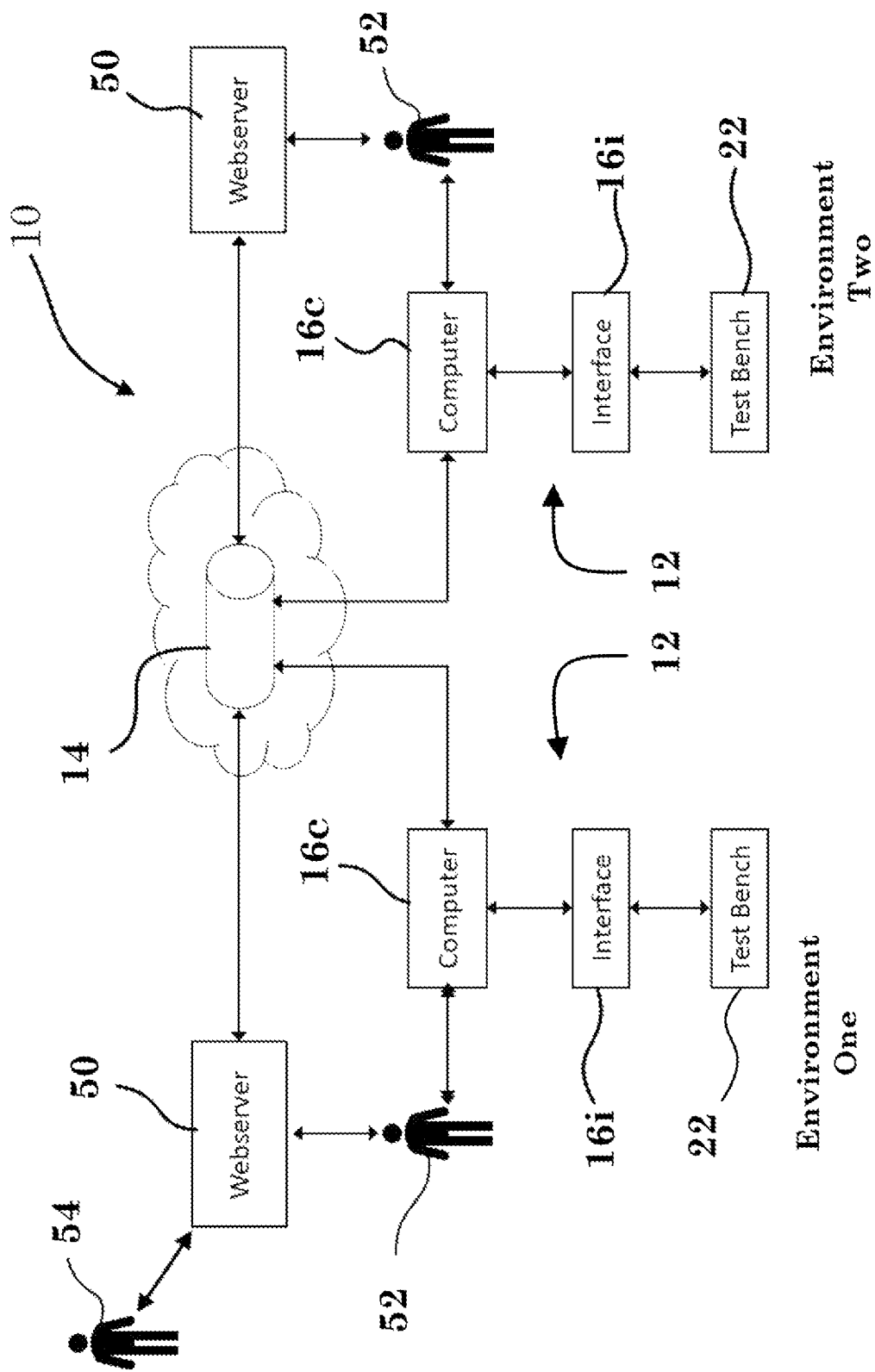
FIG. 3 is a block diagram representation of a plurality of test benches associated with a centralized storage system.

Reviewing now more particularly to FIG. 3, an exemplary platform 10 configured for evaluating and profiling metering technologies using information derived from a plurality of fluid meter test systems 12 deployed in a plurality of environments and in communication with a centralized data storage system 14 is presented. The platform 10 is in communication with a plurality of test bench systems 12 characterized by test system data and deployed in a plurality of environments. Each of the plurality of test bench systems 12 are configured with a controller 16 comprising a computing device 16c for automatically controlling its respective test bench system 12 to measure the accuracy of fluid meters 34. The computing device preferably defines an integral interface 16i or is in communication with an interface 16i that controls its respective test bench 22. Each controller is in communication with a centralized data storage system 14 either directly or indirectly via a device such as a webserver 50. A local user 52 with direct access to the controller 16 or remote user 54 connected to a controller 16 via a webserver 50 may conduct or monitor testing. Notably, a remote user 54 may be in communication with a webserver 50 or a centralized data storage system 14 using an application executed by a device such as a smartphone.

The test system software is loaded on each computing device 16c or is operably associated with each computing device 16c (e.g., software as a service). The test software is configured to provide a user interface to allow either a local user 52 or a remote user 54 to communicate with the controller 16 components to conduct fluid meter testing and generate meter data for the meters under test 34. For this document, meter data comprises meter type data, meter test data, and meter environmental data. The test system software is further configured to transfer at least part of the test system data and the meter data to a centralized data storage system 14, described in more detail below. It should be appreciated that the test system software may be loaded locally on computer 16c, or it may be software made available over a network via a "software as a service" system as well as a mixture of the two. Software as a service is simply software that is accessed over a network. The platform 10 is configured to use the centralized meter data and test system data to define a prior knowledge and derive a posterior knowledge to provide a profile for each meter tested.

As noted above, meter data comprises meter type data, meter test data, and meter environmental data.

Meter Type Data

The first data type considered is the meter type data. Exemplary meter type data is provided in Table 1 below.

TABLE 1

Meter Type Data

| Name | Description |
| --- | --- |
| Manufacturer | Who manufactured the meter |
| Manufactured Date | When the meter was manufactured |
| Date Placed in Service | When the meter was placed in service |
| Manufacturer Contact Information | Manufacturer website, phone contacts, electronic contacts |
| Meter Housing element | The material used to construct housing and housing ID number |

TABLE 1-continued

Meter Type Data

| Name | Description |
| --- | --- |
| Meter Register element | Type of register and date register associated with housing |
| Meter measurement elements | Type of measurement elements and when measurement elements were associated with housing |
| Meter transmitter element | If a transmitter is present, transmitter identifying information |
| Meter ID | Meter Identification Number |
| Meter Size | Size of the meter |
| Meter Type | Metering technology |
| K Factor | Correction factor |
| User Defined | Any data a user might wish to record and monitor |

As Table 1 above indicates, there are many meter parameters that fall under meter type data, including a housing element identifier, a measuring element identifier, a register identifier, and a transmitter identifier.

Figure 4:
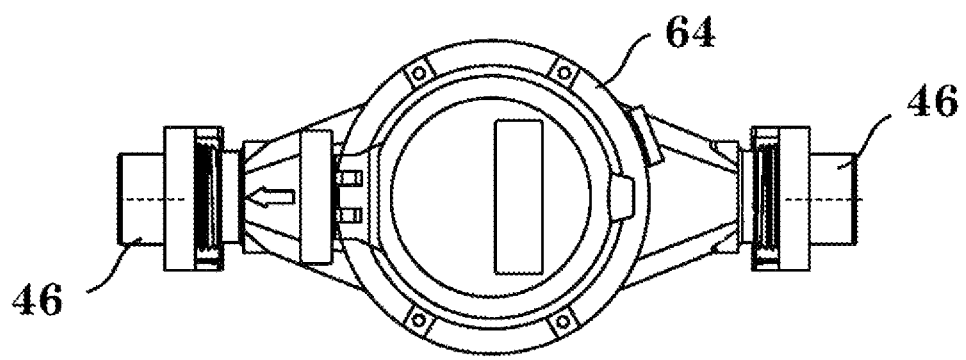
FIG. 4 is a top plan view of an exemplary fluid meter comprising a register and housing.
Figure 5:
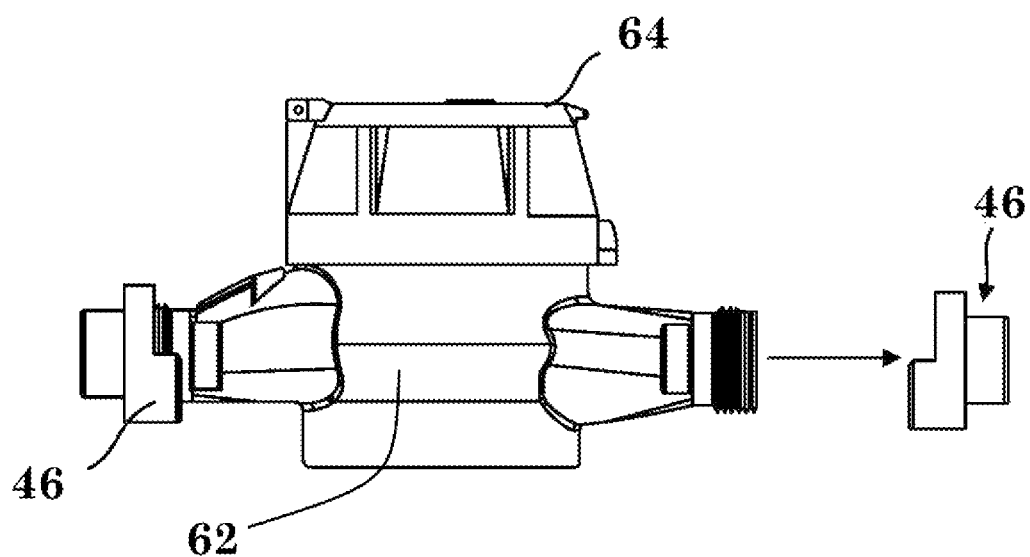
FIG. 5 is a side elevation view of the meter in FIG. 3.
Figure 6:
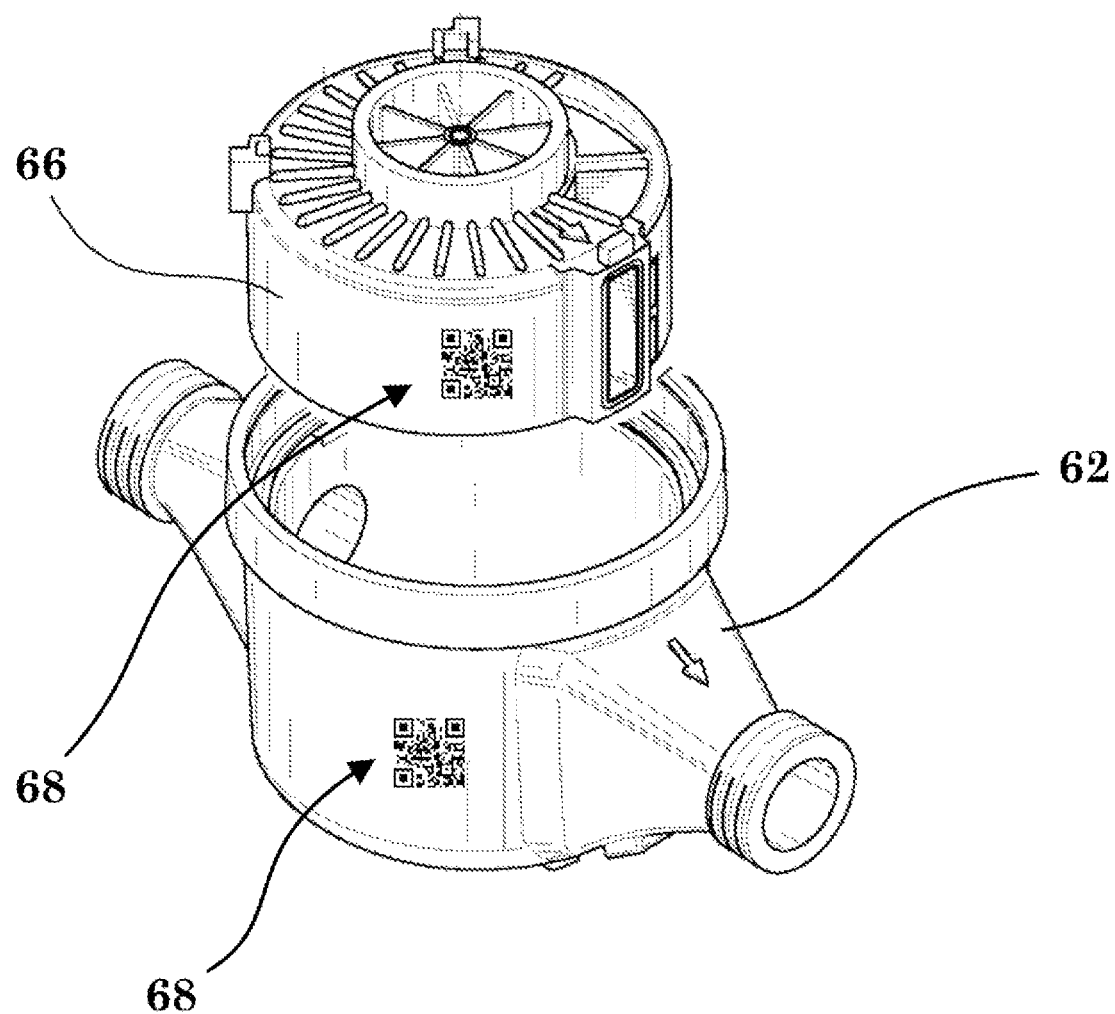
FIG. 6 is a partially exploded side perspective view of an exemplary meter housing (minus the bottom plate) and internal measuring components (no register) associated with a tracking element.
Figure 7:
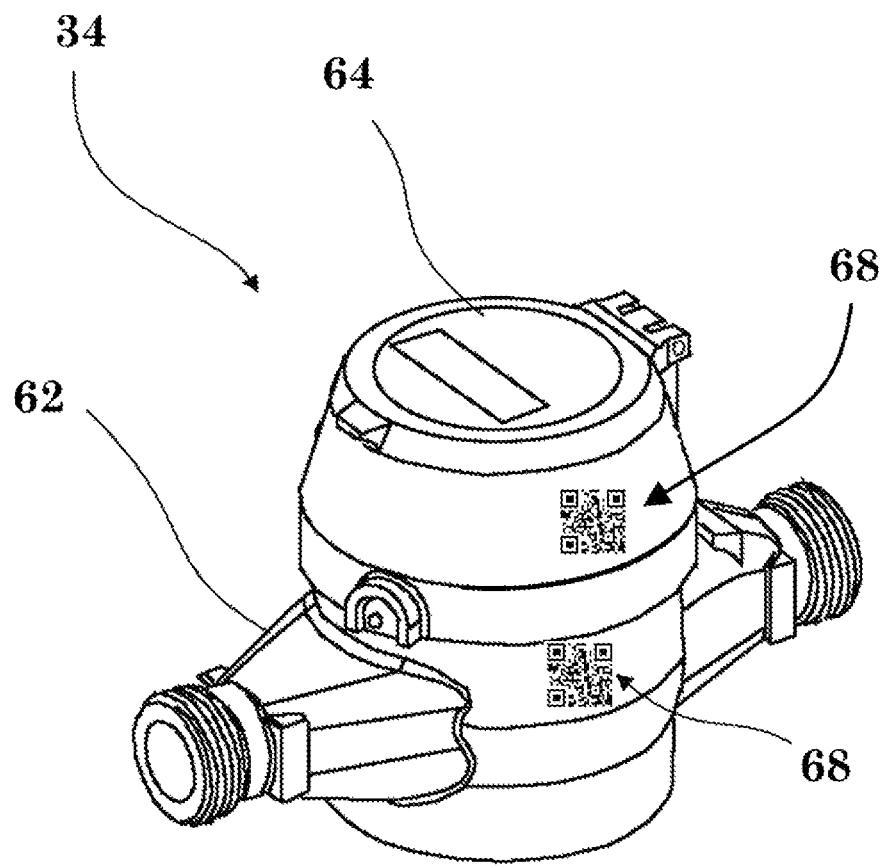
FIG. 7 is a side perspective view of an exemplary meter with a tracking element associated with the housing and register.

Referring now to FIG. 4 through FIG. 7, one feature of the disclosed technology includes optional tracking of meter components (i.e., sub-components). For example, as depicted in FIG. 4 through FIG. 6, for a typical water meter, such meter can be described as having three major components: (1) Housing element 62, (b) Register element 64, and (c) measuring element 66. For one embodiment of the disclosed invention, a tracking component 68 is associated with each meter sub-system. One advantage of tracking sub-components is the lower cost of "refurbishing" a meter. Here, a utility will only replace a sub-system of a metering device. For example, the water meter housings 62 is not removed from service, and one or more of the sub-components are changed, such as register 64 and measuring element 66. The assumption is that the housing 62 is significantly more durable than the register 64 and measuring element 66, and it is significantly more expensive to remove the entire meter than to replace the sub-components. However, such can affect the accuracy of meter data if not tracked. Based on the example above, the register 64 and the measuring element 66 may be called "wearable" components.

Additionally, tracking sub-component performance allows for tracking at least (a) the performance, (b) the mean time between failures, and (c) the expected life span of the wearable components. Such information can be used to alert the approaching end of life of a meter sub-component. Another benefit of tracking sub-components is that one is more confident about the sub-components defining a metering unit. It should be appreciated that not all sub-components are compatible with each other. For example, not all measurement components 66 are compatible with all housing elements 62, and not all registers 64 can be correctly coupled with all measurement components 66. Should the incompatible sub-components be associated in a metering unit, such a metering unit will provide inaccurate measurement data. Thus, for the preferred embodiment, the housing tracking item 68 can include information compatibility data for the various sub-components.

The software that uses the tracking information can be configured to scan the tracking item 68 associated with housing 62 and measurement components 66 and verify that the proper measurement components 66 are installed inside the housing 62. Similarly, the tracking element 68 associated with the register 64 can be used to verify the measurement components 66 are compatible with the register 64.

Meter Test Data

The second data type considered is the meter test data. Exemplary meter type data is provided in Table 2 below.

TABLE 2

Meter Test Data

| Name | Description |
| --- | --- |
| Meter Serial/ID Number | Meter identification information |
| Last Date Tested | Date of last test |
| Previous Register Reading | The number displayed by the meter's register during a pervious test. |
| Current Register Reading | The current number displayed by the meter's register. |
| Current Usage Data | Indicates how much fluid flow the meter has measured since its last test |
| Running Total of Usage Data | Indicates how much fluid flow the meter has measured since being put into service. |
| Test Count | Number of times the meter was tested for the current tests |
| Passed/Failed | Flag indicating if meter passes or fails |
| Average Error | The average error defined as the difference between MUTs measured volume and the reference volume |
| Certification Status | The Certification Status of the meter |

As depicted in Table 2 above, exemplary meter test data includes meter identification information, the date last tested, previous register reading, current register reading, current usage data, running total of usage data, test count, pass/fail flag, average measurement error and meter certification status.

Meter Environmental Data

Ideally, meter environmental data includes the location where the meter is installed (e.g., GPS coordinates), fluid quality data, and meter mounting position. Meter environmental data can be any data related to the environment the MUT 34 was or will be subjected to during use. Table 3 below lists exemplary meter environmental data.

TABLE 3

Meter Environmental Data

| Name | Description |
| --- | --- |
| Location | The location where the meter is installed or will be installed; an example would be global positioning (GPS) data; |
| Mounting Position | Mounting position can affect the way a meter wears over time. Examples include horizontal and vertical data. |
| Fluid Quality Data | Deposition value; suspended solid value; Specific Conductance (mS/cm), pH, Dissolved Oxygen (mg/l), Salinity (ppt), Turbidity (NTU), Ammonium(a) (mg/l-N), Nitrate (mg/l-n), Chloride (mg/l), Total Dissolved Gas (mmHg), Transmissivity, Ambient Light ($\mu$mol s-1 m-2), Chlorophyll ($\mu$g/l); |
| Minimum Temperature Maximum Temperature Average Temperature | The temperature can be provided by the meter or a general temperature for the location data. |
| User Defined | User Defined data |

Test System Data

Test System Data is considered next. As noted above, the platform 10 comprises a plurality of test bench systems characterized by test system data. One example of a test bench system is the exemplary fluid meter test system 12 described above. Such a test system includes a collection of technologies combined to generate meter data, including fluid meter accuracy data. One purpose of test system data is to allow platform 10 to generate a meter data quality indicator/value, which is an indication of the validity of the associated meter data.

Preferably, the fluid meter test system 12 has been tested and certified to comply with a predefined regulatory standard to provide traceability to such standards. Examples include the National Institute of Standards and Technology (NIST). Further, the test technicians are evaluated to verify the test technicians know how to accurately use the fluid meter test system 12. Thus, exemplary test system data includes a list of the technologies and their individual calibration status and the standard to which they are tested to verify compliance. Also included is a list of test technicians that have been evaluated and deemed to have the ability to componentry use the fluid meter test system 12.

The test system data may also include the test process used by a test technician. For example, the test system may be evaluated to verify that the test technicians and test system hardware and software are capable of accurately testing fluid meters to the ISO/AWWA C715 standard. Any test process may be evaluated, and a data confidence value assigned to the associated data using such a process. For example, if meter data is generated by (a) a test system with current calibrations for all hardware components (i.e., a certified test system), (b) has the latest material hardware and software upgrades, and (c) is operated by verified technicians, the meter data would be given a meter data quality value of "High." Exemplary data quality values would range from High to Medium to Low. Any suitable method for identifying data quality may be used, including numbers. Such data quality value would preferably be associated with meter data transferred to the centralized data storage system for the meter under test 34.

A Posterior Database

As noted above, the platform software is configured to associate meter data with test system data in a centralized data storage system 14 to define and create an A Posterior Meter Database (APM Database), providing knowledge from observations and experience through the deduction of probable causes with regard to meter performance. Such APM Database ideally provides a plurality of meter dependability and accuracy values based on real-world data from meters used in a plurality of environments from around the world. An a posteriori analysis based on such meter data includes values for the mean time between failures (MTBF), MTBF values for a particular environment, accuracy drift value, accuracy drift value for a particular environment over time, and based on usage data.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should, therefore, not be limited by the above-described embodiment, method, and examples but by all embodiments and methods within the scope and spirit of the invention as claimed.

What is claimed is:

1. A platform configured for evaluating metering technologies and generating meter profiles using information derived from a plurality of meters retrieved from a plurality of metering environments, said platform comprising:
   a centralized data storage system in communication with at least one test bench system;
   a computing device for automatically controlling the at least one test bench system to measure the accuracy of fluid meters to generate meter test data;
   test system data for said at least one test bench system;
   meter data comprising meter type data and meter test data for each meter tested;
   meter environmental data comprising meter install location data;
   wherein said computing device is configured to (a) generate meter profiles using at least part of said of said meter data, at least part of said meter environmental data, and at least part of said test system data and transfer said meter profiles to said centralized data storage system or (b) transfer at least part of said test system data, at least part of said meter data, and at least part of said meter environmental data to said centralized data storage system for generating meter profiles.

2. The platform configured for evaluating metering technologies as in claim 1, wherein said meter environmental data comprises at least one of fluid quality data and meter mounting orientation.

3. The platform configured for evaluating metering technologies as in claim 1, wherein said meter type data comprises at least three of:
   meter manufacturer, meter model, meter size, register type, transmitter type, meter manufacture date and meter placed in service date.

4. The platform configured for evaluating metering technologies as in claim 1, wherein said meter type data comprises at least three of a housing element identifier, a measuring element identifier, a register identifier and a transmitter identifier.

5. The platform configured for evaluating metering technologies as in claim 1, wherein said test system data comprises the calibration status for the test bench system, said calibration status identifying the regulatory standard in which the test bench system is certified.

6. The platform configured for evaluating metering technologies as in claim 1, wherein said test system data comprises test technician certification status indicating the test system for which said test technician is certified.

7. The platform configured for evaluating metering technologies as in claim 1, wherein said test system data comprises a data quality value.

8. The platform configured for evaluating metering technologies as in claim 1, wherein a meter database associates a posteriori meter values derived from an a posteriori analysis of at least part of said test system data, said meter data, and said meter environmental data.

9. The platform configured for evaluating metering technologies as in claim 1, wherein said meter profile comprises at least one of a mean time between failure value for a meter type or a mean time between failure value for a meter type for a particular environment.

10. The platform configured for evaluating metering technologies as in claim 1, wherein said meter profile comprises at least one of an overall accuracy drift value, an accuracy drift value for a particular environment or an accuracy drift value based on usage.

11. A platform configured for evaluating and profiling metering technologies, said platform comprising:
a centralized data storage system;
a computer controlled test bench system in communication with said centralized data storage system, said computer controlled test bench system configured to (a) to generate or receive meter data, and (b) measure the accuracy of fluid meters retrieved from a plurality of metering environments;
test system data that characterizes said computer controlled test bench system;
meter accuracy data generated by said computer controlled test bench system;
a platform computer configured to generate a meter data quality value for each meter tested based at least in part on said meter accuracy data and at least part of said test system data and wherein said platform computer associates said meter data quality value with the meter associated with said meter accuracy data; and
wherein said platform computer is further configured to provide a meter profile for each meter tested.

12. The platform configured for evaluating and profiling metering technologies as in claim 11, wherein said meter data comprises meter type data, and meter environmental data.

13. The platform configured for evaluating and profiling metering technologies as in claim 12, wherein said meter type data comprises at least three of: meter manufacturer, meter model, meter size, register type, transmitter type, meter manufacture date and meter placed in service date.

14. The platform configured for evaluating and profiling metering technologies as in claim 12, wherein said meter type data comprises at least two of a housing element identifier, a measuring element identifier, a register identifier and a transmitter identifier.

15. The platform configured for evaluating and profiling metering technologies as in claim 11, wherein said platform computer controls said test bench system.

16. The platform configured for evaluating and profiling metering technologies as in claim 11, wherein said computer controlled test bench system stores its meter data, meter accuracy data, meter data quality value, and said test system data in a local data silo in communication with said centralized data storage system.

17. The platform configured for evaluating and profiling metering technologies as in claim 11, wherein said meter environmental data comprises meter install location and at least one of fluid quality data and meter mounting position.

18. The platform configured for evaluating and profiling metering technologies as in claim 15, wherein said fluid quality data comprises at least four of deposition value, suspended solid value, strainer flow value, low temperature, high temperature, average temperature, specific conductance (mS/cm), pH, dissolved oxygen (mg/l), salinity (ppt), turbidity (NTU), ammonium (a) (mg/l-N), nitrate (mg/l-n), chloride (mg/l), total dissolved gas (mmHg), transmissivity, ambient light (µmol s−1 m−2), and chlorophyll (µg/l) for the fluid being metered.

19. A platform configured for evaluating and profiling metering technologies, said platform comprising:
a centralized data storage system means for communicating with a test bench system;
a computer configured to control a test bench system and evaluating and profiling metering technologies;
a computer controlled test bench system characterized test bench system data;
wherein said computer is configured to use said test bench system for testing a fluid meter characterized by meter data comprising at least meter type data, where the fluid meter is one of a new fluid meter or a used fluid meter from any one of a plurality of metering environments and generating meter accuracy data and associating a meter profile with the fluid meter, said meter profile based on said meter accuracy data, said test bench system data, and said meter data; and
wherein said computer is configured to generate a meter data quality value for each meter profile and associating said meter data quality value with said meter profile.

20. The platform configured for evaluating and profiling metering technologies as in claim 19, wherein said computer controlled test bench system stores at least one of said meter accuracy data, said meter data, said test system data and said meter data quality value in a local data silo in communication with said centralized data storage system means.

* * * * *